United States Patent Office 3,385,690
Patented May 28, 1968

3,385,690
SYNERGISTIC HERBICIDAL MIXTURES
Raymond W. Luckenbaugh, Wilmington, Del., assignor to
E. I. du Pont de Nemours and Company, Wilmington,
Del., a corporation of Delaware
No Drawing. Continuation-in-part of application Ser. No.
415,484, Dec. 2, 1964, which is a continuation-in-part
of application Ser. No. 322,074, Nov. 7, 1963. This
application Mar. 13, 1967, Ser. No. 622,450
16 Claims. (Cl. 71—93)

ABSTRACT OF THE DISCLOSURE

Synergistic herbicidal mixtures containing siduron, 1-(2-methylcyclohexyl)-3-phenylurea and one of the following compounds:

Diuron, 3-(3,4-dichlorophenyl)-1,1-dimethylurea,
Linuron, 3-(3,4-dichlorophenyl)-1-methoxy-1-methylurea,
Neburon, 1-n-butyl-3 - (3,4 - dichlorophenyl) - 1 - methylurea,
Diphenamide, N,N-dimethyl-2,2-diphenylacetamide,
Norea, 3-(hexahydro-4,7-methanoindan-5-yl)-1,1-dimethylurea,
"Cotoran," 3-(m - trifluoromethylphenyl) - 1,1 - dimethylurea and prometryne, 2-methylmercapto-4,6 - bis - (isopropylamino)-s-triazine.

Prior applications

This application is a continuation-in-part of my U.S. application Ser. No. 415,484 filed on Dec. 2, 1964 (U.S. Patent 3,309,192) which is a continuation-in-part of my U.S. applications Ser. Nos. 272,865 and 272,834 both filed Apr. 15, 1963 (now abandoned) which are continuation-in-part applications of my U.S. applications Ser. Nos. 221,299 and 221,331 both filed Sept. 4, 1962 (now abandoned) which are continuation-in-part applications of my U.S. application Ser. No. 188,981 filed Apr. 20, 1962 (now abandoned). It is also a continuation-in-part of my U.S. application Ser. No. 322,074 filed Nov. 7, 1963 (now abandoned).

Background of the invention

The ability of two compounds to create results that are better than the additive effect of the two compounds has been a subject of avid study among scientists, especially in the art of herbicides. It is generally accepted that obtaining better-than-additive effect from a combination of compounds cannot be reliably predicted. Continued study has uncovered many individual combinations that produce better than additive or synergistic results as it is usually called. The invention disclosed below adds another disclosure to the study of synergism.

Summary of the invention

This invention relates to methods and compositions for destroying weeds. More specifically, it refers to methods and mixtures for selectively controlling weeds by applying a herbicidal amount of a mixture of 1-(2-methylcyclohexyl)-3-phenylurea and another compound to areas of weed growth.

Description of the embodiments of the invention

I have discovered that by mixing a first compound, 1-(2-methylcyclohexyl)-3-phenylurea, known generically as siduron, with any one of a second compound at the below indicated ratios and applying the resulting mixtures at herbicidal rates to areas of weed growth the weeds are controlled. This control of weeds is achieved with rates of active compounds below that expected for the individual compounds added together. The secondary compound can be any one of the following.

| Generic name: | Chemical name |
|---|---|
| Diuron | 3-(3,4 - dichlorophenyl) - 1,1-dimethylurea. |
| Linuron | 3-(3,4-dichlorophenyl)-1 - methoxy-1-methylurea. |
| Neburon | 1-n - butyl - 3 - (3,4 - dichlorophenyl)-1-methylurea. |
| Diphenamide | N,N-dimethyl - 2,2 - diphenylacetamide. |
| Norea | 3-(hexahydro-4,7 - methanoindan-5-yl)-1,1 - dimethylurea. |
| Not available | 3 - (m - trifluoromethylphenyl)-1,1-dimethylurea. |
| Prometryne | 2 - methylmercapto - 4,6 - bis-(isopropylamine) - s - triazine. |

In the following discussion of the invention the compounds will be described by their generic names for the sake of simplicity.

Use

Mixtures used in my invention retard the growth of many annual weed grasses and some perennial weed grasses such as Johnson grass, Bermuda grass and the like. I have noticed that the effect on perennial weed grasses is often limited to plants growing from seed. If the perennial weed has developed rhizomes the compound has a less pronounced effect on the plants.

The following representative list sets forth weed grass plants exhibiting retarded growth approximately two weeks after a pre-emergence application of a mixture used in this invention.

| Common name: | Gramineae |
|---|---|
| Smooth crabgrass | Digitaria ischaemum. |
| Large crabgrass | Digitaria sanguinalis. |
| Annual brome | Bromus brizaeformis. |
| Downy brome or cheat | Bromus tectorum. |
| Smilograss | Orizopsis miliacea. |
| Goosegrass | Eleusine indica. |
| Medusahead wildrye | Elmyus caput-medusae. |
| Colorado grass | Panicum texanum. |
| Switch grass | Panicum vigratum. |
| Dallis grass | Paspalum dilatatum. |
| Bahia grass | Paspalum notatum. |
| Pearlmillet | Pennisetum glaucum. |
| Johnson grass | Sorghum halepense. Sorghum alumum. |
| Sudan grass | Sorghum sudanense. |
| Barnyard grass | Echinochloa crusgalli. |
| Green foxtail | Setaria viridis. |
| Giant foxtail | Setaria faberii. |
| Yellow foxtail | Setaria glauca. |
| Fall panicum | Panicum dichotomiflorum. |
| Nimblewill | Muhlenbergia schreiberi. |

The following representative list sets forth broadleaved weed plants controlled by the mixtures used in this invention.

| Common name: | Gramineae |
|---|---|
| Pigweed | Amaranthus spp. |
| Ragweed | Ambrosia spp. |
| Lambsquarters | Chenopodium album. |
| Pennsylvania smartweed | Polygonum pensylvanicum. |
| Purslane | Portulaca oleracea. |
| Horse purslane | Trianthema portulacastrum. |

An annual plant is defined in the Journal of the Weed Society of America, vol. 10, #3, July 1962, as any plant that completes its life cycle from seed in one year.

For the purposes of this specification, the plants of the above list including the annual weed grasses and perennial weed grasses growing from seed such as Bermuda grass, nimblewill and Johnson grass are stated generically to be "seedling weed grasses."

Weeds are defined as any unwanted plant. For the purposes of this specification it is assumed that annual grasses that are commonly cultivated such as ryegrass, wheat, barley and oats are not weeds.

The mixtures of this invention have utility for both pre- and post-emergence control of an unusually large variety of weed species in crop and non-crop areas.

Process

The preparation of the active toxicants used in the mixtures of this invention are taught by the following references:

Siduron, U.S. Patent 3,309,192,
Diuron, U.S. Patent 2,655,445,
Linuron, U.S. Patent 2,960,534,
Neburon, U.S. Patent 2,655,444,
Diphenamide, Journal of Organic Chemistry, vol. 17, pp. 770–777 (1952),
Norea, U.S. Patent 3,304,167,
3 - (m-trifluoromethylphenyl)-1,1-dimethylurea, U.S. Patent, 3,134,665,
Prometryne, U.S. Patent 2,909,420.

The above references are herein incorporated by reference.

Compositions

Compositions of this invention comprise a mixture used in this invention together with one or more surface-active agents.

The surface-active agent used in this invention can be a wetting, dispersing or an emulsifying agent which will assist dispersion of the mixture. The surface-active agent or surfactant can include such anionic, cationic and non-ionic agents as have heretofore been generally employed in plant control compositions of similar type. Suitable surface-active agents are set out, for example, in Searle, U.S. Patent 2,426,417; Todd, U.S. Patent 2,655,447; Jones, U.S. Patent 2,412,510; or Lenher, U.S. Patent 2,139,276. A detailed list of such agents is set forth in "Detergents and Emulsifiers Annual" (1964), by John W. McCutcheon, Inc.

Suitable surface-active agents for use in compositions of the present invention are: polyethylene glycol fatty acid esters and fatty alkylol amide condensates, alkylaryl sulfonates, fatty alcohol sulfates, dialkyl esters of sodium sulfosuccinate, fatty acid esters of sodium isethionate, polyoxyethylene ethers and thioethers and long chain quaternary ammonium chloride compounds.

Surface-active dispersing agents such as sodium lignin sulfonates, low viscosity methyl cellulose, polymerized sodium salts of alkylnaphthalene sulfonic acids are also suitable in the herbicidal compositions of this invention.

Among the more preferred surfactants are the anionic and non-ionic type. Among the anionic surface-active agents, preferred ones are alkali metal or amine salts of alkylbenzene sulfonic acids such as dodecylbenzene sulfonic acid, sodium lauryl sulfate, alkylnaphthalene sulfonates, sodium N - methyl-N-oleoyltaurate, oleic acid ester of sodium isethionate, dioctyl sodium sulfosuccinate, sodium dodecyldiphenyloxide disulfonate. Among the non-ionic compounds, preferred members are alkyl phenoxy poly (ethyleneoxy)ethanols such as nonylphenyl adducts with ethylene oxide; trimethylnonyl polyethylene glycol ethers, polyethylene oxide adducts of fatty and rosin acids, long chain alkyl mercaptan adducts with ethylene oxide and polyethylene oxide adducts with sorbitan fatty acid esters.

In general, less than 10% by weight of the surface-active agents will be used in compositions of this invention and ordinarily the amount of surface-active agents will range from 1–5% but may even be less than 1% by weight.

Additional surface-active agents can be added to the above formulation to increase the ratio of surface-active agent:active agent up to as high at 5:1 by weight. Normally the purpose of adding higher amounts of surfactant is to increase the growth retardant effect of the mixture. When used at higher rates it is preferred that the surfactant be present in the range of one fifth to five parts surfactant for each one part of its active toxicants.

Plant growth retardant compositions of this invention can contain, in addition to a surfactant, finely divided inert diluents such as talcs, natural clays including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybean and cottonseed.

Preferred diluents are clays of hydrated aluminum silicate, hydrated aluminum magnesium silicate and hydrated aluminum magnesium iron silicate.

The amount of the finely divided inert solid diluent can vary widely but will generally range from 10 to 98% by weight of the growth retardant composition. The particle size can vary considerably but will ordinarily be somewhat under 50 microns in the finished formulation. Such compositions are prepared by blending the ingredients and grinding in a hammer mill or an air attrition mill or similar device until uniform powders are obtained which have a particle size smaller than 50 microns. Compositions containing a surface-active agent and a solid inert diluent are preferably wettable powders containing from 25 to 50% of the mixture of active toxicants.

The mixtures of this invention can also be formulated as high strength compositions in which the active ingredient may be present in amounts ranging from 90–99%. The remainder of the composition comprises surface-active agents, preferably in amounts of from 0.2 to 2% and diluents, as described above. Such compositions are prepared by blending and grinding the ingredients to obtain a homogeneous powder of fine particle size.

Compositions of these plant growth retardants and inert solid diluent can also be formulated into granules and pellets. In such compositions, the diluent will generally range from 65 to 99% and the active ingredient can range from 1 to 35%. It should be understood that it will not be necessary to include a surfactant in the granular and pelletized composition. To prepare granules the herbicides can be dissolved in a solvent, and this solution can be sprayed over pre-formed clay granules, expanded verciculite or the like while agitating the mixture to distribute the active ingredient over and throughout the granular mass. Such granules can range in particle size of from +60 mesh to +4 mesh, and an active ingredient content of 1 to 6% is preferred. It is also possible to make such granules by mixing the finely divided diluent and finely divided herbicide, for instance by grinding together, and then forming granules by adding water, tumbling and drying the resulting spheres.

Pellets can be prepared by extruding a mixture that comprises the mixture of active toxicants, pelleting clay diluent and water into strands, cutting these, and drying the product. Pellet size can range from 10 mesh to larger shapes such as ⅜ inch cubes. Pellets preferably contain from 5 to 35% of the active toxicants. In addition to the diluents, pelletized and granular compositions can contain additives such as binders, surfactants and the like.

In addition to the formulation described above, suspension concentrates can also be prepared. These formulations are prepared by wet milling the ingredients; i.e., ball milling or by sand grinding using the method described in Hochberg, U.S. Patent 2,581,414, issued Aug. 19, 1948, or Littler, U.S. Patent 3,060,084 issued Oct. 23, 1962. Using the methods described in these patents, fine particles of the active compounds within the scope of this invention will be dispersed evenly in a diluent. Such compositions normally contain from 15 to 50% active ingredient and are characterized by having particles which are substantially less than 5–20 microns in diameter.

Water extendable oil compositions can also be employed with one or more of the mixtures of this invention. In these plant growth regulant compositions, surface-active agents and an oil form a liquid which can be conveniently poured and measured. Such solutions can be mixed with water at the point of application to form an emulsion containing the herbicide and the surface-active agent. Such compositions have the advantage that the oil will often act as a foam inhibitor and thus reduce the tendency for large amounts of surfactants to form objectionable foam. These oil formulations can be either dispersions of the active toxicants in finely divided form in non-solvent carriers, or they can be solutions in solvent carriers. A non-solvent carrier is an oil in which the urea has low solubility, for instance less than 0.1% at 25° C. Many aliphatic hydrocarbons are examples of such non-solvent carriers. Solvent carriers include toluene, kerosene, xylene, alkylated naphthalenes, DMF, N-methylpyrrolidone, cyclohexanone, isophorone and the like. Preferably, the oils should be water immiscible and be of a type in which the active agent will be soluble in the amounts used in particular formations. The dispersions are prepared by wet-milling the ingredients, for example, in a ball mill or sand mill. The solutions are prepared by blending and agitating the ingredients, possibly with application of heat.

In these emulsifiable oil concentrates, the mixture of active toxicants will be present in amounts ranging from 5 to 35% by weight. Precise concentrations of active toxicants, of course, will depend on the intended use of the composition. When mixed with water at the point of application the oil concentrate will be diluted so that in the final formulation the active toxicants will be present in amounts ranging from 0.5% to 2% by weight. It will be understood that foliage application of the emulsifiable compositions will have utility for regulating the growth of several undesirable annual grass species and broad leaf species along highway and railroad rights-of-way, as well as other locations.

It is, of course, also possible to use such oil compositions of the active toxicants by extending them with other oils, for example, diesel oil, herbicidal oil, and the like for uses such as weed control on railroad rights-of-way.

The percent ranges set forth above are all based on the weight of the indicated ingredients.

Application

The mixtures of this invention are applied directly to the soil as pre-emergence or as post-emergence treatments or to weed plants foliage as a post-emergence treatment. They also can be mixed intimately with the soil in pre-emergence treatments. Rates of application of the siduron in the mixture can be in the range of ½ to 20 pounds per acre and will preferably be used as the rate of 1 to 8 pounds per acre to control the seedling weed grasses described above. Rates of siduron as high as 24 pounds have been used in tests on established turf grasses without undesirable injury.

More specifically, as a pre-emergence application on crop lands, 2 to 8 pounds per acre of siduron used in this invention will control the growth of weed grasses. There is a good safety margin to crop plants such as cucumbers, cotton, potatoes, flax, squash, lima beans, corn, eggplants, red clover, ryegrass, tomatoes, lespedeza, peppers, soybeans, red beets, alfalfa, sugar beets, green beans, carrots, peanuts, okra and the like. The weed grass usually emerges and then fails to develop, showing symptoms of severe growth retardation. The siduron used in the invention retards a weed grass such as crabgrass without harming cultivated annual grasses such as ryegrass.

As an application on established growing lawns before a weed grass such as crabgrass appears, growth of crabgrass is controlled with 2 to 16 pounds of siduron per acre. There is no injury to established Kentucky bluegrass, bentgrass, creeping red fescue or common Bermuda grass growing from rhizomes. The crabgrass emerges and then fails to develop.

As a directed post-emergence application on crop lands at any time from the moment the weeds emerge to the three leaf stage, 2 to 8 pounds per acre of siduron will prevent the further development of the weed grass. There is no perceptible injury to crop plants such as cucumbers, cotton, potatoes, flax, squash, lima beans, eggplant, red clover, tomatoes, lespedeza, peppers, soybeans, red beets, alfalfa, sugar beets, green beans, carrots, peanuts, okra, corn and the like.

As an application on established lawns after the crabgrass emerges to the 3 leaf stage, 3 to 16 pounds per acre of siduron ingredient will prevent the further development of crabgrass without injury to the established lawn grasses.

The mixtures of this invention can be applied admixed with other chemicals which are used in agronomic and horticultural management and are compatible with the compounds of this invention. Such chemicals may be, but are not restricted to, the classes of chemicals commonly known as plant nutrients, fertilizers, insecticides, fungicides, and nematocides. Typical of the insecticides that can be used are:

1,2,3,4,10,10-hexachloro - 6,7-epoxy - 1,4,4α,5,6,7,8,8α-octahydro - 1,4,5,8-dimethanonaphthalene (Dieldrin) 1–2 pounds per acre
1,2,4,5,6,7,8,8-octachloro - 4,7-methano - 3α,4,7,7α-tetrahydroindane (Chlordane), 2.5–10 pounds per acre
1,1,1-trichloro - 2,2-bis(p-methoxyphenyl)ethane (Methoxychlor), 2–4 pounds per acre
1,1,1-trichloro - 2,2-bis(p-chlorophenyl)ethane (DDT), 10–20 pounds per acre, and
1-naphthyl-N-methylcarbamate ("Sevin") 2–4 pounds per acre.

Insecticides in compositions of this invention are present at the rate of 0.1 to 10 parts by weight for each one part by weight of the mixture of active toxicants.

Fungicides that can be used in conjunction with the active toxicants of this invention include:

Metal salts of ethylene bisdithiocarbamic acid, e.g. sodium, manganese, zinc and iron salts;
N-trichloromethyl-mercapto - 4-cyclohexene-1,2-dicarboximide;
Phenylmercury acetate;
Inorganic mercury salts;
Methylmercury dihydroxypropyl mercaptide;
Methylmercury acetate;
N-trichloromethylthiophthalimide;
2,3-dichloro-,1,4-naphthoquinone;
2,3,5,6-tetrachloro-1,4-benzoquinone;
2,4-dichloro-6-(o-chloroanilino)-s-triazine;
Copper A;
Metal salts of alkyl and dialkyl dithiocarbamic acid, e.g. Zn, Na, K, Fe, Mn, Ni;
Zinc pyridinethione;
S-(1-oxido-2-pyridyl)-isothiuronium chloride;
Tetrachloroisophthalonitrile;
Tetramethylthiuram disulfide;
Hydroxymercurichlorophenol and mixtures of these last two, and methyl mercury dicyandiamide.

When present in compositions of this invention the above-described fungicides will be present at the rate of .02 to 10 parts by weight based on the weight of the two active toxicants present in the composition.

The control of weed grasses with 1-(2-methylcyclohexyl)-3-phenylurea is advantageously accomplished together with the use of conventional herbicides in situations where crabgrass is growing with weeds controlled by the second herbicide. The synergistic effect achieved by combining the several conventional herbicides mentioned above with siduron allows for a substantial saving of chemicals and expenditure by the farmer.

Illustrative of herbicides and their herbicidal amount that can be used in conjunction with siduron in sprays and granular formulations to take weeds out of desirable plants are the following:

| Lbs./Acre | Herbicide | Desirable Plants |
|---|---|---|
| 1-4 | 1-n-butyl-3-(3,4-dichlorophenyl)-1-methylurea, neburon. | Ornamentals and lawn turf grasses. |
| 0.2-4 [1] | 3-(3,4-dichlorophenyl)-1,1-dimethylurea, diuron. | Sugar cane, pineapple, grass seed crops, alfalfa and cotton. |
| 0.2-4 [1] | 3-(3,4-dichlorophenyl)-1-methoxy-1-methylurea, linuron. | Soybeans, edible beans. |
| 1-4 [2] | N,N-dimethyl-$\alpha,\alpha$-diphenylacetamide, diphenamide. | Tobacco, tomatoes, peanuts and soybeans pre-emergence. |
| 0.4-4 | 3-(hexahydro-4,7-methanoindan-5-yl)-1,1-dimethyl, urea, norea | Pre-emergence in cotton. |
| 0.4-4 | 3-(m-trifluoromethylphenyl)-1,1-dimethylurea. | Do. |
| 0.2-4 | 2-methylmercapto-4,6-bis-(isopropylamine)-s-triazine, prometryne. | Do. |

[1] 1-4 preferred.
[2] 2-4 preferred.

The amount of second herbicide set forth in the left column is in addition to a base rate of two pounds per acre of siduron. A herbicidally effective amount of siduron will range from 1 to 8 lbs./acre. Accordingly the amount of second herbicide in the mixture will be more or less than that described above depending on the quantity of siduron in the mixture. A herbicidally effective amount of the mixture will vary from a mixture containing one pound of siduron and 0.1 pound of second herbicide up to eight pounds of siduron and as much as sixteen pounds of second herbicide.

Fertilizers commonly called plant nutrients can also be applied together with the mixture used in this invention. The plant nutrients include the commonly used compounds of nitrogen, phosphorus, and potassium; i.e. ammonium sulfate, ammonium nitrate, urea, methylene ureas, low molecular weight urea-formaldehyde polymers, sodium nitrate, anhydrous ammonia, aqueous ammoniacal solutions of urea, or ammonium nitrate, aqueous solutions of urea, or ammonium nitrate, ammonium phosphates, superphosphates, triple superphosphates and phosphoric acid and the potassium salts such as the chloride, sulfate and nitrate. The plant nutrients are applied individually or in a mixture with each other as so-called "complete mixtures" of N-P-K which may also contain one or more of the "trace element" plant nutrients; i.e., manganese, zinc, iron, boron, magnesium, etc.

The active toxicants are preferably added to such fertilizer mixtures or compounds following the usual mixing, granulation, ammoniation, drying or other manufacturing operations to avoid possible adverse effects of such operations on the efficacy of the compounds as weed grass retardants or for controlling annual broadleaf weeds.

It is understood that the mixtures of this invention are applied to the "locus" of the grass or broadleaf weed's growth. By "locus" is meant the plant itself when visible above the ground and when the plant is not visible the immediate area of soil where the broadleaf or grass weed plant is developing.

The following additional examples, in which all percents unless otherwise specified are by weight, are provided so as to more clearly explain this invention.

Example 1

| | Percent |
|---|---|
| Siduron | 40 |
| Norea | 10 |
| Diatomaceous silica | 48 |
| Coconut acid ester of sodium isethionate | 1 |
| Sodium lauryl sulfate | 1 |

The ingredients are blended and micropulverized to pass a 60 mesh screen.

This wettable powder formulation in the amount of 2.5 pounds of active toxicants is added to 80 gallons of water in a spray tank. A surfactant such as trimethylnonyl polyethylene glycol ether is added to this mixture at the rate of 6 pounds. This tank spray mixture is applied to one acre of cotton which is infested with crabgrass in the 1 to 2 leaf stage and several species of broadleaf weeds Excellent retardation of the weeds is obtained. The cotton grows free of most weed competition.

Example 2

| | Percent |
|---|---|
| Siduron | 40 |
| 3-(m-trifluoromethylphenyl)-1,1-dimethylurea | 10 |
| Diatomaceous silica | 48 |
| Coconut acid ester of sodium isethionate | 1 |
| Sodium lauryl sulfate | 1 |

The above ingredients are blended and micropulverized to achieve a particle diameter of less than 50 microns.

This wettable powder formulation in the amount of 2.5 pounds of active toxicants is added to 80 gallons of water in a spray tank. Six pounds of trimethylnonyl polyethylene glycol ether is added to this mixture. This tank spray mixture is applied to one acre of cotton prior to emergence of weed plants. Weeds in the area include *Digitaria spp., Setaria spp., Amaranthus spp.,* and *Chenopodium album.* The weeds are effectively controlled by the mixture and a good crop of cotton is obtained.

Example 3

The following wettable powder can be diluted with water or it may be made up as a tank mix in conjunction with 0.2-5 parts of trimethylnonyl polyethylene glycol ether per part of active ingredient:

| | Percent |
|---|---|
| Siduron | 62.3 |
| Diuron | 7.7 |
| Attapulgite clay | 18.0 |
| Dioctyl sodium sulfosuccinate | 2.5 |
| $Na_2HPO_4$ | 2.5 |
| Partially desulfonated sodium lignin sulfonate | 2.0 |
| Synthetic fine silica | 5.0 |

This wettable powder formulation is applied at the rate of 2.25 pounds active toxicants per acre in conjunction with 4 pounds of sulfactant in 40 gallons of water per acre as a directed post-emergence spray to crabgrass in the 1 to 3 leaf stage and several broadleaf species of weeds in a field of cotton when the cotton is 6 inches high. Excellent control of the crabgrass and broadleaf weeds is obtained.

Example 4

The same formulation and procedure of Example 3 is used, but there is substituted an identical amount by weight of linuron for the diuron. The composition is applied at the same rate to a field of soybeans. Crabgrass, foxtail, pigweed, and several other weed species are present in an early development stage. Excellent control of the weeds is obtained. The soybeans show normal growth.

Example 5

The same formulation and procedure of Example 3 is used, but there is substituted an identical amount by weight of prometryne for the diuron. The composition is applied at the same rate to a similar field of cotton.

Weeds are effectively controlled. The cotton shows normal growth.

Example 6.—Pellet formulation

The following pellet formulation is prepared:

| | Percent |
|---|---|
| Siduron | 5.5 |
| Diphenamide | 5.5 |
| Anhydrous sodium sulfate | 10.6 |
| Mississippi sub-bentonite | 33.0 |
| Kaolin Clay | 33.0 |
| Lignin sodium sulfonate | 13.0 |

These ingredients are mixed and blended by micropulverizing. Approximately 18% water as calculated on a weight basis is added to the formulation and thoroughly mixed. The resulting product is extruded into pellets through a screw type extruder fitted with a die containing orifices of 3/32 inch. The extruded strands are conveniently cut into small pellets as they come out of the extruder die. The pellets are air dried. After drying the pellets can be easily handled and applied as such. However, they readily soften and disintegrate when mildly agitated in water and can also be applied in water rather than as the pellets.

The pellets are applied at the rate of two pounds of active toxicants to a one acre field of peanuts. Pigweed and Johnson grass weeds are effectively controlled. The peanut crop shows normal growth.

Example 7

| | Percent |
|---|---|
| Siduron | 52.5 |
| Neburon | 17.5 |
| Sodium alkyl naphthalene sulfonate | 2.5 |
| Partially disulfonated sodium lignin sulfonate | 3.0 |
| Kaolin Clay | 24.5 |

The above ingredients are blended and micropulverized to a particle size less than 50 microns in diameter.

The formulation described above is applied preemergence at the rate of 8 pounds of active toxicants per acre in 100 gallons of water for the control of crabgrass growth in an established bluegrass-fescue lawn. Excellent retardation of crabgrass is obtained, without noticeable damage to the desirable turf grasses.

In order to establish synergism between siduron and the other active toxicants in the mixtures of this invention, tests were carried out using the siduron-diuron mixture. Calculation of synergism was based on the methods of Dr. S. R. Colby as described in Weeds, vol. 15, No. 1, pp. 20–22 (January 1967).

Diuron and siduron were compared separately and together upon applying compositions containing the toxicants to areas in which pigweed and Johnson grass were growing. A tabulation of the test results follows.

| Toxicant | Lbs./acre | Percent Control Pigweed | Percent Control Johnson Grass |
|---|---|---|---|
| Diuron | 0.25 | 0 | (1) |
| | 0.5 | 0 | 47 |
| | 1.0 | 72 | 68 |
| | 1.5 | 93 | 90 |
| Siduron | 1.0 | 1 | 39 |
| | 2.0 | 0 | 78 |
| | 4.0 | 0 | 85 |
| | 8.0 | 0 | 46 |
| Diuron and Siduron | 0.25+1 | 93 | (1) |
| | 0.25+2 | 93 | (1) |
| | 0.25+4 | 100 | (1) |
| | 0.5+1 | 64 | 88 |
| | 0.5+2 | 100 | 98 |
| | 0.5+4 | 100 | 86 |
| | 1+1 | 100 | 100 |
| | 1+2 | 100 | 100 |
| | 1+4 | 100 | 98 |

[1] No data.

I claim:

1. A synergistic herbicidally effective amount of a mixture comprising one part by weight of 1-(2-methylcyclohexyl)-3-phenylurea and 0.1 to 2 parts by weight of a second compound selected from the group consisting of:
- 3-(3,4-dichlorophenyl)-1,1-dimethylurea,
- 3-(3,4-dichlorophenyl)-1-methoxy-1-methylurea,
- 1-n-butyl-3-(3,4-dichlorophenyl)-1-methylurea,
- N,N-dimethyl-2,2-diphenylacetamide,
- 3-(hexahydro-4,7-methanoindan-5-yl)-1,1-dimethylurea,
- 3-(m-trifluoromethylphenyl)-1,1-dimethylurea,
- 2-methylmercapto-4,6-bis-(isopropylamino)-s-triazine.

2. A synergistic herbicidal mixture according to claim 1 wherein the second compound is 3-(3,4-dichlorophenyl)-1,1-dimethylurea.

3. A synergistic herbicidal mixture according to claim 1 wherein the second compound is 3-(3,4-dichlorophenyl)-1-methoxy-1-methylurea.

4. A synergistic herbicidal mixture according to claim 1 wherein the second compound is 1-n-butyl-3-(3,4-dichlorophenyl)-1-methylurea.

5. A synergistic herbicidal mixture according to claim 1 wherein the second compound is N,N-dimethyl-2,2-diphenylacetamide.

6. A synergistic herbicidal mixture according to claim 1 wherein the second compound is 3-(hexahydro-4,7-methanoindan-5-yl)-1,1-dimethylurea.

7. A synergistic herbicidal mixture according to claim 1 wherein the second compound is 3-(m-trifluoromethylphenyl)-1,1-dimethylurea.

8. A synergistic herbicidal mixture according to claim 1 wherein the second compound is 2-methylmercapto-4,6-bis-(isopropylamino-s-triazine.

9. Method of destroying weeds comprising applying to the locus to be protected a herbicidally effective amount of a mixture of one part by weight of 1-(2-methylcyclohexyl)-3-phenylurea and 0.1 to 2 parts by weight of a second compound selected from the group consisting of:
- 3-(3,4-dichlorophenyl)-1,1-dimethylurea,
- 3-(3,4-dichlorophenyl)-1-methoxy-1-methylurea,
- 1-n-butyl-3-(3,4-dichlorophenyl)-1-methylurea,
- N,N-dimethyl-2,2-diphenylacetamide,
- 3-(hexahydro-4,7-methanoindan-5-yl)-1,1-dimethylurea,
- 3-(m-trifluoromethylphenyl)-1,1-dimethylurea,
- 2-methylmercapto-4,6-bis-(isopropylamino)-s-triazine.

10. Method according to claim 9 wherein the second compound is 3-(3,4-dichlorophenyl)-1,1-dimethylurea.

11. Method according to claim 9 wherein the second compound is 3-(3,4-dichlorophenyl)-1-methoxy-1-methylurea.

12. Method according to claim 9 wherein the second compound is 1-n-butyl-3-(3,4-dichlorophenyl)-1-methylurea.

13. Method according to claim 9 wherein the second compound is N,N-dimethyl-2,2-diphenylacetamide.

14. Method according to claim 9 wherein the second compound is 3-(hexahydro-4,7-methanoindan-5-yl)-1,1-dimethylurea.

15. Method according to claim 9 wherein the second compound is 3-(m-trifluoromethylphenyl)-1,1-dimethylurea.

16. Method according to claim 9 wherein the second compound is 2-methylmercapto-4,6-bis-(isopropylamino)-s-triazine.

References Cited

UNITED STATES PATENTS

| | | |
|---|---|---|
| 2,655,444 | 10/1953 | Todd. |
| 2,655,445 | 10/1953 | Todd. |
| 2,709,648 | 5/1955 | Ryker et al. _____ 71—2.6 |
| 3,278,292 | 10/1966 | Johnson _____ 71—2.6 |
| 3,309,192 | 3/1967 | Luckenbaugh _____ 71—2.6 |

JAMES O. THOMAS JR., *Primary Examiner.*